United States Patent [19]

Jackson

[11] 4,154,783

[45] May 15, 1979

[54] PROCESS FOR PRODUCING DIELECTRIC OPTICAL WAVEGUIDES

[75] Inventor: Lynden A. Jackson, Ipswich, England

[73] Assignee: The Post Office, London, England

[21] Appl. No.: 818,719

[22] Filed: Jul. 25, 1977

Related U.S. Application Data

[62] Division of Ser. No. 686,375, May 14, 1976.

[30] Foreign Application Priority Data

May 14, 1975 [GB] United Kingdom ............... 20345/75

[51] Int. Cl.² .......................... B29F 3/10; B29D 11/00
[52] U.S. Cl. ........................................ 264/1; 264/174; 264/210 R; 264/235
[58] Field of Search ................ 264/174, 1, 235, 210 R

[56] References Cited

U.S. PATENT DOCUMENTS

| 3,936,519 | 2/1976 | Crystal | 264/174 |
| 3,993,726 | 11/1976 | Moyer | 264/174 |
| 4,017,579 | 4/1977 | Roe et al. | 264/174 |

FOREIGN PATENT DOCUMENTS

| 2110934 | 6/1973 | Fed. Rep. of Germany | 264/174 |
| 2102419 | 9/1974 | France | 264/174 |
| 50-8732 | 4/1975 | Japan | 264/174 |
| 166263 | 1959 | Sweden | 264/174 |
| 1371740 | 10/1974 | United Kingdom | 264/174 |

*Primary Examiner*—Jay H. Woo
*Attorney, Agent, or Firm*—Kemon & Estabrook

[57] ABSTRACT

A method of coating a fibre in which a sleeve of polymer is extruded, fibre is fed into the sleeve as it is formed, and the diameter of the sleeve is reduced by a drawing process to produce a sleeve of polymer which loosely envelops the fibre. We also provide a fibre having a tubular sleeve of polymer, the sleeve having its molecules orientated to lie longitudinally with respect to the axis of the fibre. The sleeve has relative strength in a longitudinal plane and relative weakness in a transverse plane.

4 Claims, 7 Drawing Figures

PROCESS FOR PRODUCING DIELECTRIC OPTICAL WAVEGUIDES

This is a division of application Ser. No. 686,375, filed 5/14/76.

This invention relates to the coating of fibres and has application to the coating of optical fibres which are used as dielectric optical waveguides.

Optical fibres are fibres of light transmitting material which can transmit light by multiple internal reflection in the fibre. The fibres have very small diameters, typically of the order of 100 microns, and are accordingly very fragile. They are coated in order to protect them from axial distortion leading to increased attenuation by radiation, to protect them from abrasion, and atmospheric attack and so maintain their pristine strength, and to provide additional strength. In one known technique for coating optical fibres an optical fibre is sandwiched between two tapes and the tapes are adhered along the junction of their edges. The fibre is held loosely within the adhered tapes which constitute a separate sleeve, so that there is a clearance between the fibre and the sleeve.

In another known technique an optical fibre is coated with a layer of extrudable polymer by direct extrusion of the polymer using an extruder with a cross-head die. The coating produced by this technique is in contact with and adhered to the fibre so that the fibre is not loose within the coating. The fibre and the polymer coating having different coefficients of thermal expansion so that, as the polymer sets, they contract at different rates. This can lead to bending of the fibre which can cause radiation of the light. This will increase the attenuation of signals which are transmitted along the fibre and is therefore undesirable.

According to one aspect of the present invention there is provided a fibre having a tubular sleeve of polymer, the sleeve having its molecules orientated to lie longitudinally with respect to the axis of the fibre.

The fibre may be an optical fibre for use as a dielectric optical waveguide. The sleeve may loosely envelop the fibre. The polymer may by polypropylene.

According to another aspect of the present invention there is provided a fibre having a tubular sleeve which loosely envelops it, said sleeve having a relatively large elastic modulus in its longitudinal direction and a relatively small elastic modulus in a transverse plane.

By loosely envelops is meant that there is at least a small but distinct clearance between the surface of the fibre and the internal periphery of the sleeve. The fibre is not stuck to the sleeve so that it can be moved axially within the sleeve. The diameter of the sleeve is, however, larger than the fibre diameter so that in the event of a slight longitudinal contraction of the sleeve relative to the fibre the buckling of the fibre will be of sufficiently large radius of curvature to prevent appreciable increase in attenuation.

By polymer we have in mind synthetic extrudable polymers of which polypropylene is a preferred example and the term polymer is intended to include any material whose molecules can be orientated to lie longitudinally with respect to the axis of a sleeve of the polymer which is produced by the process to be described hereinafter.

The fibre may be an optical fibre for use as a dielectric optical waveguide. The polymer may be polypropylene.

According to a further aspect of the present invention there is provided a method of coating a fibre which comprises forming by extrusion a sleeve of polymer, feeding the fibre into the sleeve as the sleeve is formed, the internal diameter of the sleeve being substantially greater than the diameter of the fibre, and reducing by a drawing process the internal diameter of the sleeve to produce a sleeve of polymer which loosely envelops the fibre.

The method has particular application to the coating of optical fibres. During the drawing process of the sleeve the molecules of the polymer tend to line up longitudinally thereof. The sleeve of polymer is normally fed through an oven as it is drawn to assist in the lining up of the molecules in the longitudinal direction. The longitudinal orientation of the molecules gives the sleeve relative strength in a longitudinal plane and relative weakness in a transverse plane. The combination of increased longitudinal strength and decreased transverse strength serves to greatly improve the sleeve's ability to protect the fibre from axial distortions. The strength in the longitudinal plane is useful in improving the overall strength and so protecting the fibre during the cable making process. The weakness in the transverse plane is useful in stripping the sleeve from the ends of a fibre to enable the fibres to be joined.

The sleeve loosely envelops the optical fibre and micro-bending problems do not occur in the present method. Also it is relatively simple to feed the fibre into the sleeve of polymer since the sleeve has a much greater diameter than the fibre before it is drawn down.

The sleeve may be heated in an oven as its diameter is reduced. The sleeve may be passed through a cooling bath after it is extruded and before its diameter is reduced.

The coated fibre may be passed through a further oven after the sleeve has been drawn. This is to substantially eliminate long term shrinkage of the sleeve after extrusion and drawing.

According to another aspect of the present invention there is provided apparatus for coating a fibre which comprises an extrusion device for extruding a sleeve of polymer, means for feeding the fibre into the sleeve as the sleeve is formed, the sleeve having a diameter substantially greater than that of the fibre, and drawing means for reducing the internal diameter of the sleeve to produce a sleeve which loosely envelops the fibre.

The extrusion device may include a screw-extruder which is arranged to feed a cross-head die. The screw-extruder may have a heated feed tube which is connected to the cross-head die by a clamp, said clamp being thermally connected to a heater. The cross-head die may have a through bore one end of which constitutes the outlet for extruding polymer, a first tubular portion which extends into the bore from its other end to a position adjacent the outlet, said first tubular portion having a tapered end portion adjacent said outlet, a second tubular portion mounted coaxially within the first tubular portion, and a third tubular portion mounted coaxially with the first and second tubular portions, said third tubular portion extending into the second tubular portion adjacent the other end of the die, out through the tapered end of the first tubular portion and terminating in the vicinity of the outlet of the die, the arrangement being such that in use a fibre passing through the third portion is thermally insulated from the heated polymer in the die over a substantial portion of its length of travel through the die by the arrangement of tubular portions.

The apparatus may include cleaning means disposed upstream of the extrusion device for cleaning the fibre before it is coated. The cleaning means may include a pair of juxtaposed felt pads between which the fibre is arranged to pass and a blowing ring for blowing cold air onto the fibre.

The apparatus may include a take-off drum from which fibre can be fed to the extrusion device and tensioning means for maintaining the fibre under a substantially constant tension. The tensioning means may comprise first and second horizontally spaced pulleys and a floating pulley arranged to sit on the fibre so that it forms a U-shape intermediate the pulleys, and two vertically spaced light sensitive detectors located such that when the fibre is at its correct tension one is above and the other is below the floating pulley, each light sensitive detector being illuminated by a light source and being connected to an electrical control for drive means of the take-off drum whereby if the floating pulley rises to interrupt light passing to the upper detector the speed of rotation of the drum is increased and if the floating pulley falls to interrupt light passing to the lower detector the speed of rotation of the drum is decreased.

The apparatus may include a cooling bath disposed immediately downstream from the extrusion device. The cooling bath may be rectangular and contain a longitudinally extending guide tube through which the coated fibre is arranged to pass, the bath having inlet and outlet apertures through which the coated fibre can pass. A plate may be located in parallel spaced relationship with the wall of the bath having said inlet aperture, the plate having an aperture corresponding in size and position to the inlet aperture, the size of said apertures being such that in use, as coated fibre enters the bath, water can flow out of the bath through said inlet aperture but is prevented by surface tension from flowing through the aperture in said plate.

The drawing means may comprise a first pair of rotatable belts, said belts being spaced apart a distance corresponding substantially to the diameter of the extruded sleeve, and a second pair of rotatable belts located downstream from said first pair, said second pair of belts being spaced apart a distance substantially less than the spacing of said first pair.

The apparatus may have an oven intermediate the first and second pair of belts, the sleeve being arranged to pass through the oven as its diameter is reduced. The apparatus may have a further oven located downstream from the second pair of belts. The further oven may have a first relatively high temperature zone, and a second relatively low temperature zone. The further oven may have air jets which are so arranged that air can be blown therethrough onto the sleeve as it leaves the further oven.

The apparatus may include a capstan located downstream from said further oven, the capstan comprising a pair of pulleys one of which is arranged to be driven at a speed slightly less than the speed of rotation of the second pair of belts to allow for shrinkage of the sleeve after it leaves the further oven.

The invention will be described now by way of example only with particular reference to the accompanying drawings. In the drawings.

Figure 1:
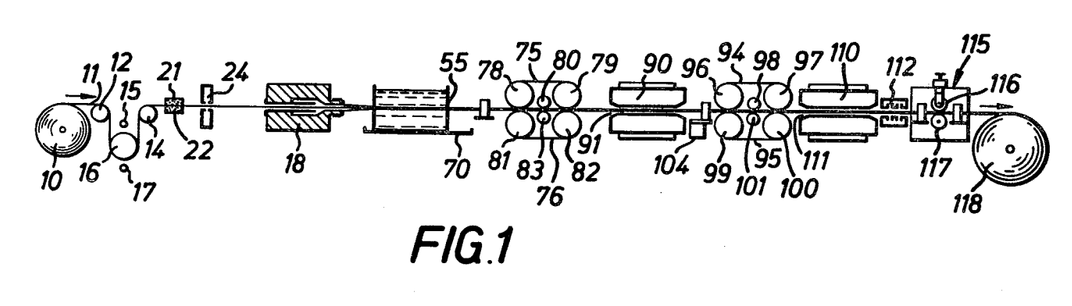
FIG. 1 is a schematic representation of an apparatus for coating an optical fibre.

Apparatus for coating a glass fibre has a drum 10 on which glass fibre to be coated is wound. The drum 10 is rotatable by means of a motor (not shown) in order to unwind fibre 11 from the drum 10.

First and second horizontally spaced pulleys 12 and 14 are spaced horizontally from the drum 10. Fibre 11 unwinding from the drum 10 passes to the pulley 12 and is made to travel along a U-shaped path between the two pulleys 12 and 14 by means of a floating pulley 16 which sits on the fibre at the bottom of the U-shape.

Two photocells 15, 17 are spaced in a vertical plane which is spaced laterally from the vertical plane containing the pulley 16. One photocell 15 is located at a position higher than the pulley 16 and the other photocell 17 at a position lower than the pulley 16. Each photocell is illuminated by a respective light source (not shown), the light sources being contained in a vertical plane and positioned such that the plane containing the pulley 16 is disposed intermediate the plane containing the photocells and the plane containing the light sources. Each photocell is connected to a circuit for controlling the speed of the motor which drives the drum 10. The arrangement is such that if the pulley 16 rises and interrupts light transmitted towards the photocell 15 the speed of the motor is increased. Alternatively if the pulley 16 falls and interrupts light transmitted towards the photocell 17 the speed of the motor is decreased. This arrangement ensures that the pulley 16 remains at a substantially constant vertical position and maintains a substantially constant tension in the fibre.

From the pulley 14 the fibre 11 passes toward a cross-head die 18 which is connected to a screw-extruder 19. The axis of the cross-head die 18 lies on a horizontal tangent from the pulley 14. A fibre cleaning arrangement, which consists of a pair of juxtaposed felt pads 21 and 22 and an annular blowing ring 24, is disposed intermediate the pulley 14 and the cross-head die 18. The blowing ring 24 has a number of nozzles which open at its inner peripheral surface. The nozzles are connected to a source of air pressure and are arranged so that air can be blown radially inwardly from the nozzles toward the centre of the ring 24.

Fibre travelling from the pulley 14 passes between the pads 21 and 22 and through the central aperture in the ring 24 before entering the cross-head die 18. The felt pads 21 and 22 are closely spaced so that they contact the fibre as it passes therebetween. The felt pads are provided to remove any dirt or similar small particles from the surface of the fibre. The blowing ring blows air onto the fibre to blow off any remaining dust or dirt.

Figures 2, 3:
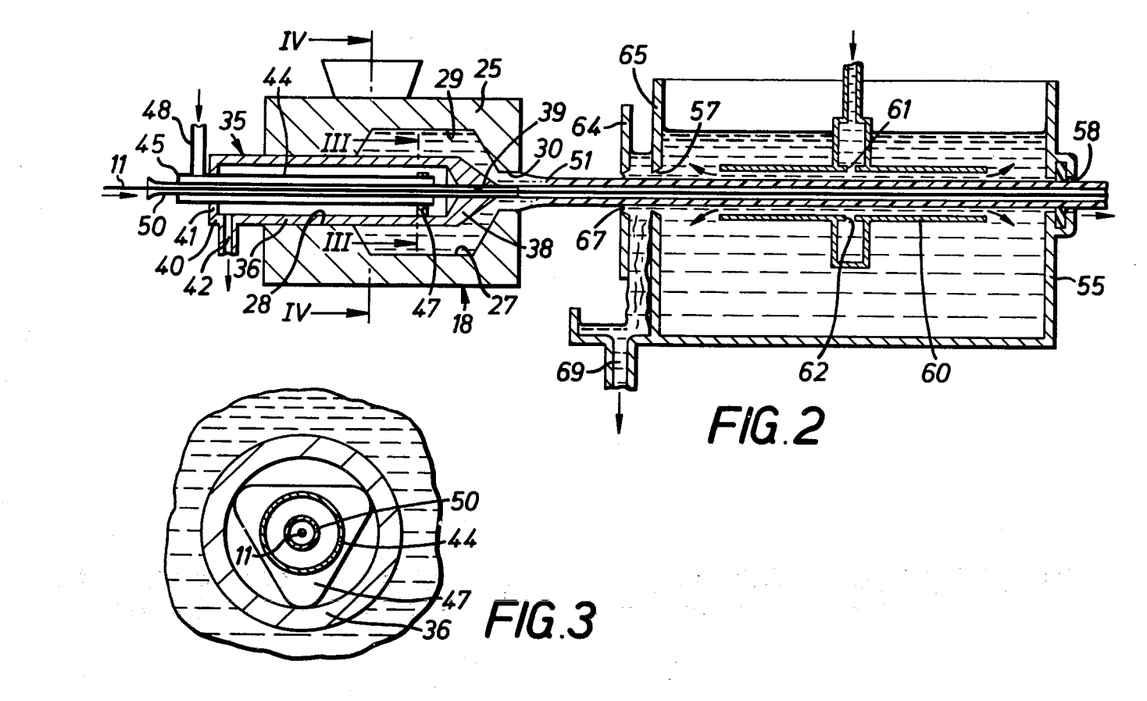
FIG. 2 is a side sectional elevation of a cross-head die and cooling bath of the apparatus of FIG. 1.
FIG. 3 is a section on the line III—III of FIG. 2.

The cross-head die 18 has a main body portion 25 with an inlet port 26 which communicates radially with a bore 27 which extends axially through the body portion 25. The bore 27 has a cylindrical first portion 28, a generally cylindrical second portion 29 extending coaxially from the first portion 28 and having a diameter larger than that of the first portion, and a cylindrical third portion 30 coaxial with the first and second portion. The cylindrical third bore portion 30 constitutes an outlet from the cross-head die 18. The inlet port 26 is clamped to the screw-extruder 19 in a manner to be described later. The screw-extruder contains polypropylene which is to be extruded through the outlet constituted by the cylindrical third bore portion 30.

The wall of the cylindrical first bore portion 28 supports a thermal insulating assembly 35 for preventing undesirable heating of the fibre as it passes through the cross-head die 18. The assembly 35 comprises an outer generally tubular member 36 which is supported by the wall of the cylindrical first bore portion 28. The tubular member 36 extends from a position external of the die 18, through the bore portion 28 and into the bore portion 29. The end 38 of the tubular member 36 within the bore portion 29 is tapered and defines a cylindrical bore 39 the diameter of which is substantially less than that of the diameter of the main part of the tubular member 36. The bore 39 terminates adjacent the cylindrical third bore portion 30. The other end 40 of the tubular member 36 has a radially inwardly extending annular flange 41 and adjacent the flange 41 the circumferential wall of the tubular member 36 has a radially outwardly extending port 42.

A second intermediate tubular member 44 is mounted coaxially with the tubular member 36. The second tubular member 44 is supported towards one end 45 thereof by the annular flange 41 and at its other end 46 by a triangular spacer 47 which is carried within the tubular member 36. The second tubular member 44 has a radially, outwardly extending port 48 adjacent its end 45.

A third inner tubular member 50 is mounted coaxially with the first and second tubular members 36, 44. The third member 50 extends through the second member 44, through the bore 39, and terminates within the third bore portion 30 of the bore 26.

Fibre travelling from the cleaning arrangement passes through the inner tubular member 50. Air from a suitable air supply is passed in through the port 48, circulates between the tubular members 36, 44 and 50 and passes out through the port 42. This arrangement effectively insulates the interior of the tubular member 50 from heated polypropylene within the die 18 over a substantial portion of the length of the tubular member 50. This serves to prevent undesirable heating of the fibre as it passes through the tubular member 50.

As the fibre 11 leaves the tubular member 50 polypropylene is extruded in the form of a sleeve 51 around the fibre between the exterior of the third tubular member 50 and the wall of the cylindrical third bore portion 30. The internal diameter of the extruded sleeve 51 is substantially greater than the external diameter of the fibre.

A cooling bath 55 is disposed downstream from the cross-head die 18. The cooling bath 55 comprises a small tank of rectangular cross section. The opposite end walls of the tank each have an aperture 57, 58, the axis of each aperture being coaxial with the axis of the cylindrical portion 30. A longitudinally extending guide tube 60 is mounted within the tank so that its axis is coaxial with the axis of the apertures 57, 58. The guide tube 60 has a pair of diametrically opposite, radially exending ports 61, 62 at its axial-mid point. A plate 64 is mounted in closely spaced relationship with the end wall 65 of the tank closest to the cross-head die 18. The plate 64 has a circular aperture 67 which is coaxial with and has a size substantially the same as the aperture 57 in the wall 65. A drain passage 69 is disposed vertically beneath the plate 64.

The tank 55 is mounted on a pair of parallel guide rails 70 (only one shown). The tank 55 is slidable along the guide rails toward or away from the die 18. In normal operation the tank 55 is disposed relatively close to the outlet of the die 18.

In use the tank 55 is filled with water to a depth such that the guide tube 60 is fully submerged. The fibre and its sleeve coating pass into the tank through the apertures 67 and 57 and into the guide tube 60 and then out through the aperture 58. Water flows in through the ports 61, 62 along the guide tube around the polypropylene sleeve and thereby cools it. It will be noted that the tube 60 guides the sleeve without actually contacting the sleeve since there is water between the sleeve and the tube 60. The water can flow out through the aperture 57 around the external surface of the polypropylene sleeve and down into the drain passage 69. The diameter of the apertures 67 and 57 are so selected that when the flow rate of water into the tank is adjusted correctly water can flow out of the tank through the aperture 57 but is prevented from flowing through the aperture 67 by the surface tension of the water. The water flowing out through the aperture 57 falls through the space between the plate 64 and the end wall 65 into the drain passage 69.

A first pair of belts 75, 76 are spaced horizontally from the cooling bath 55. The belt 75 extends around rollers 78, 79 and 80 and the belt 76 extends around rollers 81, 82 and 83. The spacing between adjacent portions of the belts 75 and 76 is substantially equal to the outer diameter of the sleeve which leaves the cooling bath 55. Each of the rollers 78 and 81 is rotatable by suitable drive means in order to drive the belts 75 and 76.

A first oven 90 is disposed downstream from the belts 75, 76. The first oven 90 is generally cylindrical and has a central cylindrical bore 91 the axis of which is coaxial with the bore in the cross-head die 18. The coated fibre which is driven from the first set of bels 75, 76 passes along the bore 91 in the oven 90.

Figure 7:
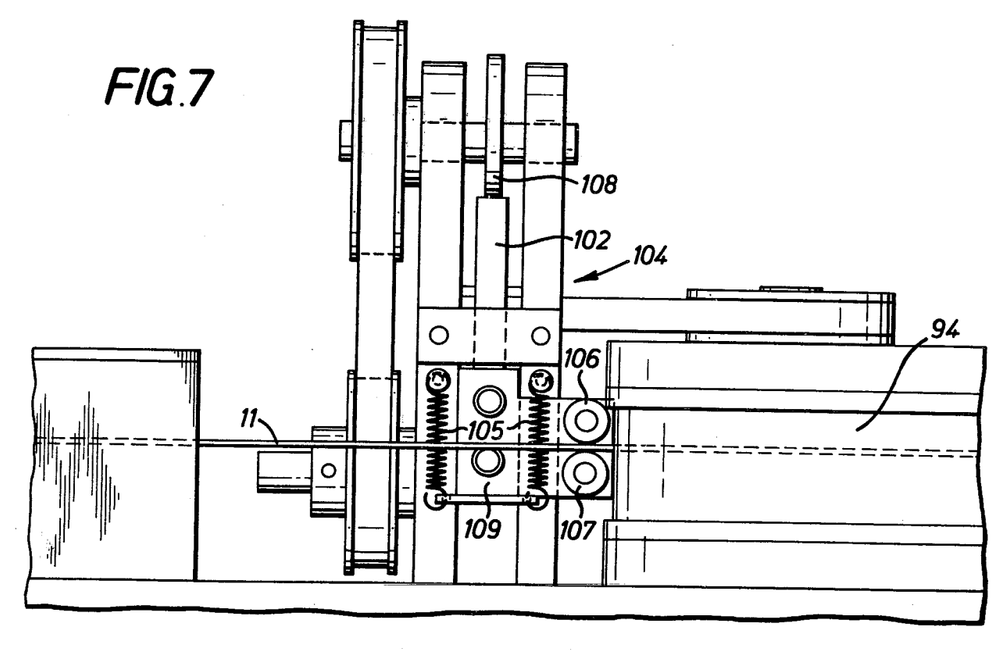
FIG. 7 is a plan view of a device used in the apparatus of FIG. 1.

A second pair of belts 94, 95 are disposed downstream from the first oven 90. The belt 94 extends around rollers 96, 97 and 98 and the belt 95 extends around rollers 99, 100 and 101. The rollers 96 and 99 are rotatable by suitable drive means in order to drive the belts 94 and 95. The spacing between adjacent portions of the belts 94 and 95 is considerably less than the spacing between the belts 75 and 76. A mechanism 104 is provided adjacent the rollers 96 and 99 for moving the coated fibre passing from the oven 90 towards the belts 94, 95 from side to side. This mechanism includes two rollers 106, 107 which are arranged with their axes vertical. The rollers are actuated to move perpendicular to the axis of the belts by a rotatable cam 108 driven from the drive means of the rollers 96 and 99. The cam 108 contacts and is arranged to move axially, a shaft 102 which can push a mounting 109 of the rollers 106, 107 against the bias of springs 105.

A second oven 110 is disposed downstream from the belts 94, 95. The second oven is generally cylindrical and has a cylindrical bore 111 the axis of which is coaxial with the bore of the oven 90. The oven 110 has two heating zones. One zone at the end of the oven closest to the belts 94, 95 can be heated to a higher temperature than the other zone towards the end of the oven remote from the belts 94, 95. A number of nozzles 112 are provided in the wall of the bore 111 at the end of the oven 110 remote from the belts 94, 95. The nozzles are connected to a source of air so that the sleeve can be cooled as it leaves the oven 110 by blowing cold air onto it.

A capstan 115 is mounted downstream from the oven 110. The capstan comprises a pair of juxtaposed pulleys 116, 117 between which the coated fibre is arranged to pass. One of the pulleys is rotatably driven. A take-up drum 118 for receiving the coated fibre is mounted downstream from the capstan 115.

Figure 4:
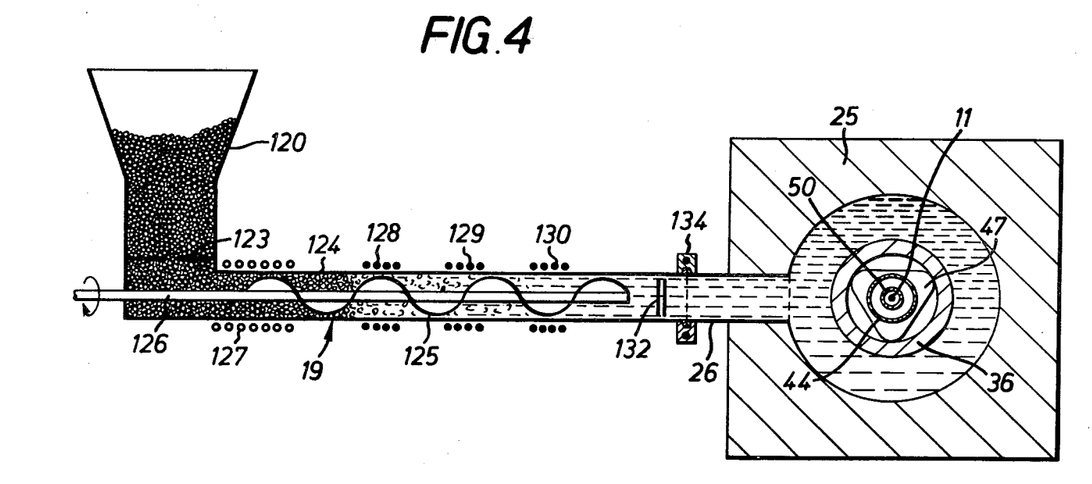
FIG. 4 is a side sectional elevation on the line IV—IV of FIG. 2 showing the screw-extruder of the apparatus of FIG. 1.
Figure 5:
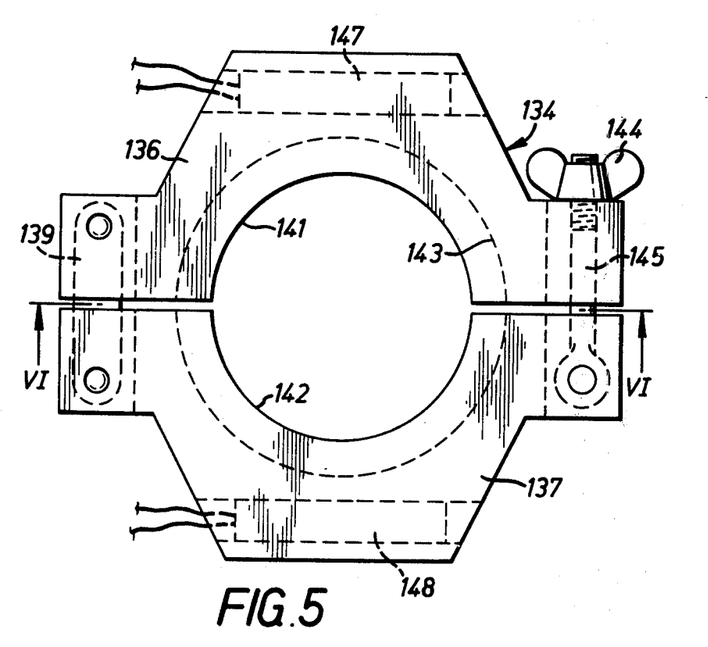
FIG. 5 is a plan view of a heated clamp used with the extruder of FIG. 4.
Figure 6:
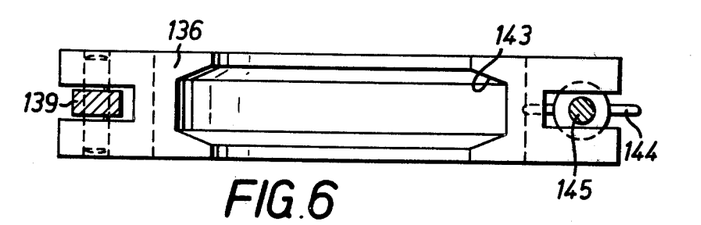
FIG. 6 is an end elevation of the heated clamp.

Turning now to FIGS. 4 to 6 the screw-extruder has a hopper 120 into which is fed granulated plastic material which in this case is polypropylene. Polypropylene is fed from the hopper 120 via a baffle 123 into a horizontally extending feed tube 124. The feed tube 124 has an axially extending Archimedean screw which is shown diagrammatically at 125. The Archimedean screw 125 is driven via a shaft 126. The feed tube 124 has four regions. A first region 127 is water cooled; the subsequent three regions are heated by three electrical heating elements 128, 129, 130. The polypropylene melts as it passes through the regions heated by the elements 128, 129, 130.

At the end of the feed tube 124 remote from the hopper 120 there is provided a breaker plate 132 which serves to smooth out the helical flow of polypropylene created by the Archimedean screw and also provides a back pressure for the screw. This end of the feed tube 124 is attached to the inlet port 26 of the cross-head die 18. The joint between the feed tube 124 and the inlet port 26 is made by means of a heated clamp 134.

Referring to FIGS. 5 and 6 the clamp 134 consists of two similar members 136, 137 which are connected together at one side by a hinge arrangement 139. Each member 136, 137 has a semi-circular surface 141, 142, the semi-circular surface being so arranged that when the two members 136 and 137 are placed in juxtaposition the surfaces define a circular aperture for the junction between the tube 124 and the port 26. The surfaces 141, 142 are recessed at 143 to provide means for engaging flanges on the end of the tube 124 and on the end of the port 26. The two members 136 and 137 can be clamped together by means of a nut 144 and screw 145. Each member 136, 137 has a cartridge heater 147, 148.

The heated clamp ring 134 is provided to prevent excessive heat loss which can occur in the vicinity of the clamp ring and which can cause a low temperature point between the feed tube 124 and the inlet port 26. If such a low temperature point were to occur the result could be a flunctuation in the dimension of the sleeve 51 extruded from the cross-head die 18.

Prior to use of the heated clamp ring the temperature in the cross-head die itself was 205° C. and the temperature in the vicinity of the clamp ring 200° C. plus or minus 10° C. With the heated clamp ring the temperature in the cross-head die is 200° C. and the temperature in the vicinity of the clamp ring 195° C.

In use glass fibre is fed from the drum 10 through the cleaning arrangement consisting of the felt pads 21, 22 and the blowing ring 24 to the cross-head die 18. As the fibre leaves the cross-head die polypropylene is extruded from the cross-head die around the fibre in the form of a sleeve. The internal diameter of the sleeve is of the order of 0.5m.m. to 1m.m. and the external diameter of the order of 2m.m. The internal diameter of the sleeve of polypropylene is thus substantially greater than the diameter of the fibre which typically has a diameter of 125 microns. The sleeve of polypropylene is then cooled as it passes through the cooling bath 55. The sleeve and fibre are pulled through the oven 90 by means of the belts 94, 95 which are driven at a speed substantially greater than the speed of the belts 75, 76. Typically the belts 94, 95 are driven at a speed of the order of 10 times greater than the speed of the belts 75, 76. The effect of this is to reduce the cross sectional dimensions of the sleeve as it passes through the oven 90. At this stage the polypropylene is in a semi-viscous state. The oven 90 is operated at a temperature of approximately 120° C.–130° C. After being drawn down the outer diameter of the sleeve is of the order of 600 microns and the internal diameter is in the range 160 microns to 300 microns. Thus, after drawing down the sleeve of polypropylene has an internal diameter which is of the order of twice that of the fibre and is such that the sleeve loosely envelops and is not adhered to the fibre. The fibre can be moved longitudinally within the sleeve but the diameter of the sleeve is sufficiently small to substantially inhibit buckling of the fibre within the sleeve.

During extrusion of the sleeve of polypropylene from the die its molecules are slightly orientated so that they tend to line up in a direction of the longitudinal axis of the sleeve. The molecules become highly orientated when the sleeve passes through the oven 90. Because of the orientation of its molecules the sleeve 150 which is produced has a relative strength in a longitudinal plane and relative weakness in a transverse plane. The strength in the longitudinal plane greatly assists in mechanical isolation of the fibre from axial distortions and gives strength to the fibre. The weakness in the transverse plane is of assistance when the sleeve has to be stripped from the ends of the fibre to allow it to be joined to another fibre.

After passing between the belts 94, 95 the coated fibre is then passed through the oven 110. The first zone of this oven closest to the belts 94, 95 is operated at a temperature of approximately 250° C. to 300° C. and the second zone remote from the belts 94, 95 is operated at a temperature of 120° C. to 130° C. This arrangement is provided so that the sleeve entering the oven is quickly heated up in the first zone to a temperature at which it anneals and is then maintained at this temperature in the second zone. The oven 110 acts as an annealing oven and is provided to substantially eliminate long term shrinkage of the polypropylene sleeve after extrusion. If the sleeve is not passed through the oven 110, shrinkage of 5% to 10% can occur and this can produce undesirable bends in the optical fibre.

Coated fibre is pulled from the annealing oven by means of the capstan 115 and is then wound onto the take-up drum 118. The pulleys 116, 117 of the capstan are arranged to rotate at a speed which is approximately 8% less than the speed of movement of the belts 94, 95. This difference in speed is provided to allow for shrinkage of the sleeve which occurs as it passes through the annealing oven. This shrinkage is of the order of 8%.

The device 104, which moves the sleeve 51 to and fro transversely to the axis of the belts 94, 95, is provided to minimise wear of the belts 94, 95.

The start-up procedure for the process is as follows. The cooling bath 55 which in normal operation is relatively close to the outlet of the cross-head die 18 is moved axially away from the die. A short length of sleeve is extruded from the die and is fed manually through the cooling bath between the belts 75, 76 through the orientation oven and fed into the belts 94, 95. Once this has occurred the cooling bath 55 is moved back to a position close to the outlet of the cross-head die 18 so that the process can continue normally. The sleeve is fed through the annealing oven 110, the capstan 115 and on to the take-up drum 118. Fibre 11 is then fed into the sleeve and manipulated so that it attaches to the internal surface of the sleeve. The sleeve, which is driven through by the belts 94, 95 then pulls the fibre with it so that it begins to wind round the take-up drum. Once the coated fibre is on the take-up drum the friction between the fibre and the sleeve on the drum ensures that the fibre is pulled through the apparatus along with the sleeve.

An alternative start-up procedure, which has been found to be very satisfactory, is as follows. The sleeve is extruded by the same procedure described in the preceding paragraph. When the sleeve has been fed through to the take-up drum 118 fibre 11 is fed into the sleeve 51 at a speed somewhat slower than that of the belts 75, 76. This speed is controlled by the pay-off drum 10, which is driven by a servo-motor, until the end of the fibre is in the region of the annealing oven 110 (the length of fibre inside the sleeve is determined by measuring the length of fibre fed into the sleeve). The pay-off drum 10 is then rapidly accelerated to about the speed of the pulleys of the capstan 115.

The coated fibre produced by the present method consists of an optical fibre in a loose fitting sleeve, the internal diameter of the sleeve being slightly greater than the diameter of the fibre whereby the fibre can be slid longitudinally within the sleeve. The material of the sleeve has a relatively high elastic modulus in the direction of the sleeve axis whilst in a transverse plane it has a relatively low modulus. The structure is thus resistant to bending but can be compressed in a direction perpendicular to its longitudinal axis.

We have found that within experimental error coating the fibre in this manner introduces no significant additional loss in the fibre.

As an alternative to a screw-extruder, a ram extruder may be used.

It will be appreciated that whilst the above description relates to the coating of a dielectric optical waveguide the present method can be used to coat other types of fibre which require protective coating.

I claim:

1. A method of coating a dielectric optical waveguide which comprises:
   feeding an optical waveguide through a cross-die extruder;
   extruding a sleeve of polymer around the waveguide as it passes through the extruder, the internal diameter of the sleeve being substantially greater than the diameter of the waveguide and the molecules of the sleeve being orientated to lie longitudinally of the sleeve;
   reducing by a drawing process the internal diameter of the sleeve to such an extent that it loosely envelops the waveguide; and
   passing the waveguide and its loosely enveloping sleeve through an annealing oven.

2. A method as claimed in claim 1 wherein the sleeve is heated as its diameter is reduced.

3. A method as claimed in claim 2 wherein the sleeve is passed through a cooling bath after it is extruded and before its diameter is reduced.

4. A method as claimed in claim 1 wherein said dielectric waveguide is cleaned prior to being coated.

* * * * *